United States Patent
Hallenstål et al.

(10) Patent No.: US 9,596,712 B2
(45) Date of Patent: Mar. 14, 2017

(54) METHOD AND APPARATUS FOR HANDLING P-CSCF FAILURE AND RESTORING CONNECTIVITY

(75) Inventors: Magnus Hallenstål, Täby (SE); Staffan Blau, Spånga (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 77 days.

(21) Appl. No.: 14/402,471

(22) PCT Filed: May 21, 2012

(86) PCT No.: PCT/EP2012/059391
§ 371 (c)(1),
(2), (4) Date: Nov. 20, 2014

(87) PCT Pub. No.: WO2013/174413
PCT Pub. Date: Nov. 28, 2013

(65) Prior Publication Data
US 2015/0124588 A1    May 7, 2015

(51) Int. Cl.
*H04W 76/02* (2009.01)
*H04W 24/02* (2009.01)
(Continued)

(52) U.S. Cl.
CPC ....... *H04W 76/028* (2013.01); *H04L 65/1016* (2013.01); *H04L 65/1046* (2013.01);
(Continued)

(58) Field of Classification Search
None
See application file for complete search history.

(56) References Cited

U.S. PATENT DOCUMENTS

2004/0203763 A1* 10/2004 Tammi .................... H04W 8/06
                                                            455/435.1
2007/0113086 A1*  5/2007 Huang ............... H04L 29/12009
                                                            713/168
(Continued)

FOREIGN PATENT DOCUMENTS

CN          1905472 A      1/2007
CN        101170553 A      4/2008
(Continued)

OTHER PUBLICATIONS

International Search Report and Written Opinion of the International Searching Authority, PCT Application No. PCT/EP2012/059391, Feb. 15, 2013.

(Continued)

*Primary Examiner* — Faruk Hamza
*Assistant Examiner* — Cassandra Decker
(74) *Attorney, Agent, or Firm* — Myers Bigel, P.A.

(57) ABSTRACT

A method for restoring connectivity between a node in an IP Multimedia Subsystem, IMS, network, and a User Equipment, UE. The UE is associated with a Proxy Call Session Control Function node, P-CSCF, of said IMS network, and with at least one control node of a packet access network, through which the UE connects to the IMS network. The method allows for restoring the connectivity of the UE to an IMS network node after said IMS node has failed to establish a communication to said UE via said P-CSCF node.

19 Claims, 6 Drawing Sheets

(51) Int. Cl.
H04L 29/06 (2006.01)
H04L 29/12 (2006.01)
H04W 76/06 (2009.01)
H04L 29/08 (2006.01)
H04W 24/04 (2009.01)

(52) U.S. Cl.
CPC ......... *H04W 24/04* (2013.01); *H04L 61/1588* (2013.01); *H04L 65/1073* (2013.01); *H04L 67/147* (2013.01); *H04W 76/027* (2013.01); *H04W 76/06* (2013.01)

(56) References Cited

U.S. PATENT DOCUMENTS

| | | | |
|---|---|---|---|
| 2008/0175157 A1* | 7/2008 | Lim | H04L 69/40 370/242 |
| 2008/0182575 A1 | 7/2008 | Torres et al. | |
| 2008/0274735 A1* | 11/2008 | Choksi | H04L 65/1073 455/432.2 |
| 2009/0180381 A1* | 7/2009 | Noel | H04L 41/5067 370/233 |
| 2010/0177767 A1* | 7/2010 | Ishii | H04W 8/04 370/352 |
| 2010/0309822 A1* | 12/2010 | Witzel | H04L 65/1096 370/259 |
| 2011/0110223 A1 | 5/2011 | Dutta et al. | |
| 2011/0128843 A1* | 6/2011 | Przybysz | H04L 29/14 370/216 |
| 2012/0179827 A1* | 7/2012 | Xue | H04L 63/08 709/227 |
| 2012/0207015 A1* | 8/2012 | Marsico | H04L 41/0663 370/221 |
| 2013/0163434 A1* | 6/2013 | Hamel | H04W 60/06 370/237 |

FOREIGN PATENT DOCUMENTS

| | | |
|---|---|---|
| CN | 101217407 A | 7/2008 |
| CN | 102138312 A | 7/2011 |
| JP | 2010-263597 A | 11/2010 |
| JP | 2010-541348 A | 12/2010 |
| WO | WO 2009/039890 A1 | 4/2009 |

OTHER PUBLICATIONS

International Preliminary Report on Patentability, PCT Application No. PCT/EP2012/059391, Jul. 14, 2014.
Ericsson, "Update the HSS initiated detach procedure", 3GPP TSG-SE WG2 Meeting #69, S2-088195, Miami, USA, Nov. 17-21, 2008, Change Request, 23.401 CF 0671, rev 2, Version 8.3.0, 4 pp.
Ericsson, "Network Initiated De-registration", Agenda Item: 8.5, Document for: Discussion, 3GPP TSG-CN1 Meeting #19, Tdoc N1-011154, Helsinki, Finland, Aug. 27-31, 2001, 6 pp.
3GPP, Technical Specification, "3rd Generation Partnership Project; Technical Specification Group Core Network and Terminals; Policy and Charging Control signalling flows and Quality of Service (QoS) parameter mapping (Release 11)", 3GPP TS 29.213 V11.2.0 (Mar. 2012), 160 pp.
3GPP, Technical Specification, "3rd Generation Partnership Project; Technical Specification Group Core Network and Terminals; Study on IMS Restoration Procedures (Release 9)", 3GPP TS 23.820 V9.0.0 (Sep. 2009), 43 pp.
3GPP, Technical Specification, "3rd Generation Partnership Project; Technical Specification Group Core Network and Terminals; IP multimedia call control protocol based on Session Initiation Protocol (SIP) and Session Description Protocol (SDP); Stage 3 (Release 11)", 3GPP TS 24.229 V11.3.0 (Mar. 2012), 728 pp.
3GPP, Technical Specification, "3rd Generation Partnership Project; Technical Specification Group Services and System Aspects; General Packet Radio Service (GPRS) enhancements for Evolved Universal Terrestrial Radio Access Network (E-UTRAN) access (Release 11)", 3GPP TS 23.401 V11.1.0 (Mar. 2012), 284 pp.
3GPP, Technical Specification, "3rd Generation Partnership Project; Technical Specification Group Services and System Aspects; IP Multimedia Subsystem (IMS); Stage 2 (Release 11)", 3GPP TS 23.228 V11.4.0 (Mar. 2012), 287 pp.
Notice of Reasons for Rejection and English language translation, JP Application No. 2015-513023, Feb. 9, 2016.
LM Ericsson, Removal of Editor's notes in TR 23.820, Agenda item: 6.2.1, Document for: Discussion/Approval, 3GPP TSG CT WG4 Meeting #38-bis, C4-081020, Jeju Island, Korea, Apr. 7-11, 2008, 6 pp.
Chinese Office Action Corresponding to Chinese Patent Application No. 201280073321.3; Mailing Date: Nov. 23, 2016; Foreign Text, 8 Pages.

* cited by examiner

METHOD AND APPARATUS FOR HANDLING P-CSCF FAILURE AND RESTORING CONNECTIVITY

CROSS REFERENCE TO RELATED APPLICATIONS

This application is a 35 U.S.C. §371 national stage application of PCT International Application No. PCT/EP2012/059391, filed on 21 May 2012, the disclosure and content of which is incorporated by reference herein in its entirety. The above-referenced PCT International Application was published in the English language as International Publication No. WO 2013/174413 A1 on 28 Nov. 2013.

TECHNICAL FIELD

The present invention relates to handling the failure of a Proxy Call Session Control Function (P-CSCF) node in an IP Multimedia Subsystem (IMS) network. In particular, it relates to handling a P-CSCF node failure in the case when a an Application Server (AS) of the IMS network tries to connect to a User Equipment (UE), which is registered with the malfunctioning P-CSCF node.

BACKGROUND

IP Multimedia (IPMM) services provide a dynamic combination of voice, video, messaging, data, etc, within the same session. By growing the numbers of basic applications and the media which it is possible to combine, the number of services offered to the end users will grow, and the inter-personal communication experience will be enriched. This will lead to a new generation of personalised, rich multimedia communication services, including so-called "combinational IP Multimedia" services.

IP Multimedia Subsystem (IMS) is the technology defined by the Third Generation Partnership Project (3GPP) to provide IP Multimedia services over mobile communication networks. IMS provides key features to enrich the end-user person-to-person communication experience through the integration and interaction of services. IMS allows new rich person-to-person (client-to-client) as well as person-to-content (client-to-server) communications over an IP-based network. The IMS makes use of the Session Initiation Protocol (SIP) to set up and control calls or sessions between user terminals (or user terminals and application servers). The Session Description Protocol (SDP), carried by SIP signalling, is used to describe and negotiate the media components of the session. Whilst SIP was created as a user-to-user protocol, IMS allows operators and service providers to control user access to services and to charge users accordingly. Other protocols are used for media transmission and control, such as Real-time Transport Protocol and Real-time Transport Control Protocol (RTP/RTCP).

Within an IMS network, Call Session Control Functions (CSCFs) perform processing and routing of signalling. CSCFs handle session establishment, modification and release of IP multimedia sessions using the SIP/SDP protocol suite. 3GPP TS23.228 describes the logical nodes P-CSCF, I-CSCF, S-CSCF, E-CSCF and BGCF. The S-CSCF conforms to 3GPP TS 24.229 and performs session control services for User Equipments (UEs). It maintains the session state to support the services, and performs the following functions:

it acts as a registrar according to [RFC3261] at registration;
  it notifies subscribers about registration changes;
  it provides session control for the registered users' sessions;
  it handles SIP requests, and either services these internally or forwards them on to a further node; and
  it interacts with IMS Application Servers.

The S-CSCF performs SIP routing according to 3GPP routing procedures. For inbound SIP traffic, the S-CSCF will route sessions to that P-CSCF whose address was stored during subscriber registration. For outbound SIP traffic, the S-CSCF interrogates a DNS/ENUM to determine how the call should be routed. The S-CSCF interacts with the Home Subscriber Server (HSS) to obtain subscriber data and to exchange authentication information using DIAMETER messages.

A User Equipment (UE) generally connects to an IMS network through a Radio Access Network (RAN). The first point of entry to the IMS network is a Proxy Call Session Control Function (P-CSCF). Once a UE is registered with a particular P-CSCF, all the SIP signalling originating and terminating at the UE will be routed through this P-CSCF.

Existing radio access networks comprise cellular networks according to the 2G and 3G standards. The process of rolling out so-called 4G networks has just begun, and it will be many years before 4G network coverage is sufficient to allow 2G and 3G networks to be withdrawn completely.

Considering further the 4G technology, this is being specified under the name LTE (Long Term Evolution) and SAE (System Architecture Evolution) in 3GPP. The LTE radio access network technology implements only a packet switched access, in contrast to 2G and 3G (using GERAN and UTRAN radio access network technologies respectively) which provide for both packet switched and circuit switched access. In 2G and 3G networks, packet switched connections are used to carry data whilst circuit switched connections are used for real-time services such as voice calls. In 4G networks, all services will be carried via packet switched connections. In the case of a voice call initiated when a user is attached to an LTE radio access network (termed Enhanced UTRAN or E-UTRAN), that call will of course make use of a packet switched connection.

The IMS network may comprise several Application Servers (AS), which implement a variety of services. For example, a voice call may be established using the IMS network by a Multimedia Telephony (MMTel) Application Server, which implements service logic for establishing and controlling voice calls.

Specifically, the GSM Association (GSMA) has published the Voice over LTE (VoLTE) profile, (GSMA IR.92 IMS Profile for Voice and SMS V4.0 http://www.gsmworld.com/documents/IR9240.pdf). It specifies the network and terminal interoperability requirements for a telephony service over an LTE RAN, using IMS as the telephony service engine.

In case of a failure of a P-CSCF with which a UE was registered, several situations may arise. For example, if the UE wishes to start an originating communication leg that is handled by an AS in the IMS network, such as for example a packet voice call, the UE will not receive a valid answer from the P-CSCF, which is unavailable. While the UE cannot reach the IMS, in such case the UE is configured to register with a different, available P-CSCF node. Once re-registration has occurred, the UE has restored the access to the IMS network and may place the originating call through one of the Application Servers thereof.

If the UE is at the terminating end of a communication chain that is being handled by an AS in the IMS network, such as for example a packet voice call, the following problem arises. An S-CSCF node in the IMS network directs a SIP INVITE request to the P-CSCF with which the target UE was registered. The P-CSCF should usually extend the request to the UE, so that the UE is able to terminate the communication leg. However, if the P-CSCF is unavailable, the requesting S-CSCF has no means of contacting the UE, and the call fails. While this problem arises for calls in a VoLTE setting, other IMS based services trying to reach the UE through the failed P-CSCF are affected in the same way.

FIG. 1 schematically illustrates the architecture under consideration for a VoLTE setup. A user terminal, or UE, connects to an LTE radio access network. The enhanced Node B (eNodeB) provides inter alia control of radio access within the LTE RAN. The serving gateway (S-GW) sits in the user plane where it forwards and routes packets to and from the eNodeB and the Packet Data Network (PDN) Gateway (P-GW). The P-GW node interfaces with other packet data networks, such as for example the depicted IMS network, of which the illustrated P-CSCF node is the entry point. The UE registers with a P-CSCF node. FIG. 1 further illustrates a Policy and Charging Rules Function (PCRF) node and a Mobility Management Entity (MME). The S/P-GW and the MME reside in the LTE Evolved Packet Core (EPC). The MME is the key control node for the LTE access-network. It is responsible for idle mode UE tracking and paging procedures including retransmissions. FIG. 1 further shows a Home Subscriber Server (HSS) that resides within the subscriber's home network.

As a result of the P-CSCF failure or malfunction, any UE that had previously registered with the P-CSCF can no longer receive terminating calls that are set up through the IMS network. It has been suggested to register each UE with at least two distinct P-CSCF nodes of the IMS network. This solution mitigates the impact of the described problem to some degree as the probability that both P-CSCF fail at the same time is low. Therefore the UE is likely reachable through at least one of the P-CSCF nodes with which it registered at any point in time. However, such a solution is not foreseen as part of the VoLTE specification, and therefore it is not applicable to one of the main applications in which the above problem arises.

A further suggestion would be to let the PDN Gateway node of the radio access network, which connects to the P-CSCF node of the IMS network, regularly check the availability of the P-CSCF node. This may be achieved by sending "ping" signals at regular intervals. If a failure is detected, the Packet Gateway node sends addresses of available alternative P-CSCF nodes to all UEs which were registered with the unavailable P-CSCF. These UEs may then re-register themselves at one of the alternative P-CSCF nodes. This solution involves potential mass signalling in the radio access network in case of a P-CSCF failure. Moreover, it requires all UEs that were registered with the unavailable P-CSCF node to re-register, while only a fraction of the UE's may have experienced the above mentioned problem. Indeed the problem only arises when a call handled by the IMS network should terminate at a UE that was registered with the unavailable P-CSCF node.

A third option is to force each UE to frequently re-register with a P-CSCF node. If re-registration with the previously used P-CSCF node fails, the UE will register with an alternative, available P-CSCF node. However, this solution causes the batteries of the terminals implementing the UE to drain quickly, as they typically use a cellular network access.

SUMMARY

According to a first aspect of the present invention, there is provided a method for restoring connectivity between a node in an IP Multimedia Subsystem (IMS) network, and a User Equipment (UE). The UE is associated with a Proxy Call Session Control Function node (P-CSCF) of said IMS network and with at least one control node of a packet access network. The UE uses said packet access network to connect to the IMS network. After the IMS node has failed to establish a communication to said UE via said P-CSCF node, the method proceeds with at said IMS node, sending a first DIAMETER request to a Home Subscription Server (HSS) node, requesting the UE to reset its connection to said packet access network;

at said HSS node, receiving said first DIAMETER request from said IMS node, providing an identity of said UE, looking up an address of at least one control node to which said UE is associated in said packet access network, and sending a second request to said at least one control node, requesting the UE to reset its connection to said packet access network; and at said control node, receiving said second request from said HSS node, and sending a third request to said UE, requesting said UE to reset its connection to said packet access network, which comprises registration to an available P-CSCF node of said IMS network.

The first DIAMETER request may preferably be DIAMETER User-Authorization-Request (UAR) having a User-Authorization-Type Attribute-Value-Pair (AVP) value indicating "NEW_REGISTRATION NEEDED".

According to a second aspect of the present invention, there is provided a method for requesting at an Internet Multimedia Subsystem (IMS) network node, a User Equipment (UE) to reset its connection to a packet access network. The method comprises sending a first DIAMETER request to a Home Subscription Server (HSS) node, requesting the UE to reset its connection to said packet access network.

According to a third aspect of the present invention, there is provided a method for handling a first DIAMETER message at a Home Subscription Server (HSS) node. The message is received from an IMS node and requests an UE to reset its connection to its packet access network. The method further comprises providing an identity of a control node of said packet access network, to which UE is associated, and sending a second request to said control node, requesting the UE to reset its connection to said packet access network.

The second request may preferably be a DIAMETER Cancel-Location-Request, (CLR) having a Cancellation-Type Attribute-Value-Pair (AVP) value indicating "RE_ATTACH_PROCEDURE".

According to a fourth aspect of the present invention, there is provided a method for handling a request at a control node of a packet access network to which a User Equipment (UE) is associated. The request is received from a Home Subscription Server (HSS) node, and requests said UE to reset its connection to said packet access network, the method comprising requesting said UE to reset its connection to said packet access network.

Preferably, said IMS node may be a Serving Call Session Control Function (S-CSCF).

Said IMS node may preferably be an IMS Application Server (IMS AS) node. The IMS AS may preferably be a Multimedia Telephony Application Server (MMTel AS), providing Voice and multimedia communication services over a mobile packet service, or a Telephony Application Server (TAS) providing Voice over Long Time Evolution (LTE), networks, or a Session Continuity and Centralization Application Server (SCC AS).

It is preferred that said packet access network may be a Long Time Evolution (LTE) network and that said control node may be a Mobile Management Entity (MME) node of said LTE network.

Alternatively it may be preferred that said packet access network may be a General Packet Radio Service (GPRS) network and that said control node may be a Serving GPRS Support Node (SGSN) of said GPRS network.

According to a further aspect of the present invention, there is provided an apparatus comprising a first node configured to operate as an IP Multimedia Subsystem (IMS) network node. The apparatus comprises a transmission unit for sending DIAMETER requests, and a processing unit configured to generate a DIAMETER request, requesting a User Equipment, UE to reset the connection to its packet access network, and to transmit said DIAMETER request to a Home Subscription Server, HSS, node.

The IMS node may preferably be configured as a Serving Call Session Control Function (S-CSCF) node.

The IMS node may preferably be configured as an IMS Application Server (IMS AS) node, the IMS AS being a Multimedia Telephony Application Server (MMTel AS) providing Voice and multimedia communication services over a mobile packet service, or a Telephony Application Server (TAS), providing Voice over Long Time Evolution (LTE) networks, or a Session Continuity and Centralization Application Server (SCC AS).

According to another aspect according to the present invention, there is provided an apparatus comprising a second node configured to operate as a Home Subscription Service (HSS) node. The apparatus comprises a transmission unit for sending requests, a receiving unit for receiving DIAMETER requests, a memory configured for storing identities relating to User Equipments (UEs) and a processing unit. The processing unit is configured to receive a DIAMETER request, requesting a User Equipment (UE) to reset the connection to its packet access network, generate a request, requesting the UE to reset its connection to said packet access network; and transmit said request to said control node.

According to yet another aspect according to the present invention, there is provided an apparatus comprising a third node configured to operate as a control node of a packet access network. The apparatus comprises a transmission unit for sending requests, a receiving unit for receiving requests, and a processing unit. The processing unit is configured to receive a request, requesting a User Equipment (UE) to reset the connection to its packet access network;

generate a request, requesting the UE to reset its connection to said packet access network; and transmit said request to said UE.

The packet access network may preferably be a Long Time Evolution (LTE) network and said control node may preferably a Mobile Management Entity (MME) node.

Alternatively, the packet access network may be a General Packet Radio Service (GPRS) network and said control node may be a Serving GPRS Support Node (SGSN).

Using the methods and apparatuses according to the present invention, it is possible to restore a communication link between an IMS Application Server and a UE, after this communication has failed because of a failure of the P-CSCF node with which the UE was registered. The methods avoid mass signalling in the UE's Radio Access Network, and does not drain the batteries of the User Terminals, as they are not forced to frequently re-register with the network. The method further uses mainly procedures that are compatible with the VoLTE specification, thereby enabling to increase the quality of service of Voice Calls in a VoLTE architecture.

BRIEF DESCRIPTION OF THE DRAWINGS

Aspects of the present invention will now be further described, by way of example only, with reference to the accompanying figures.

DETAILED DESCRIPTION

According to the present invention, there is provided a method for restoring the connectivity between a node in an IP Multimedia Subsystem (IMS) network, and a User Equipment (UE). The UE is associated with a Proxy Call Session Control Function node (P-CSCF), of said IMS network. Further, the UE is associated with a control node of a packet access network, which the UE uses to connect to the IMS network. Furthermore, said IMS node has failed to establish a communication to said UE via said P-CSCF node.

Figure 1:
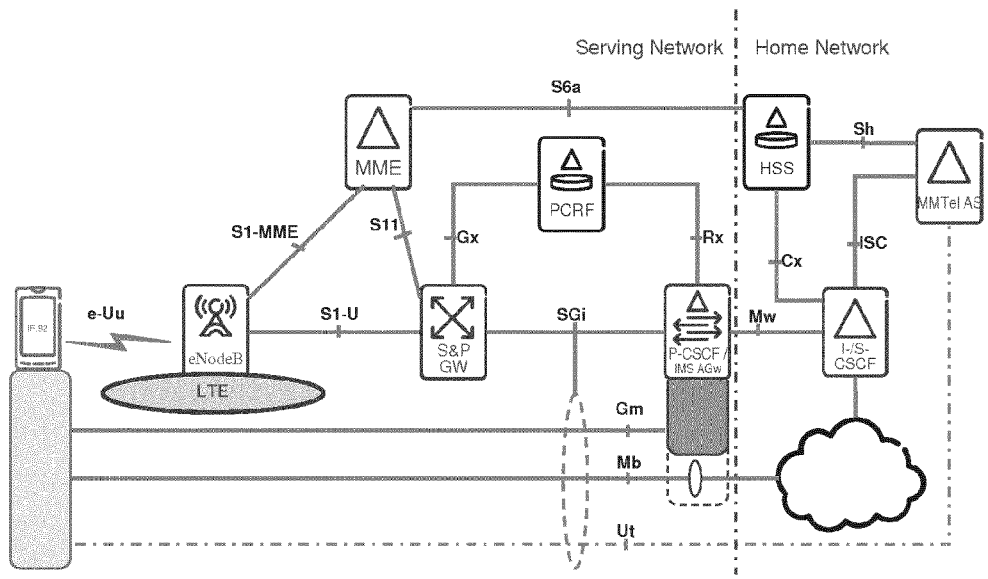
FIG. 1 shows a known network architecture including an LTE radio access network, and an IMS network.
Figure 2:
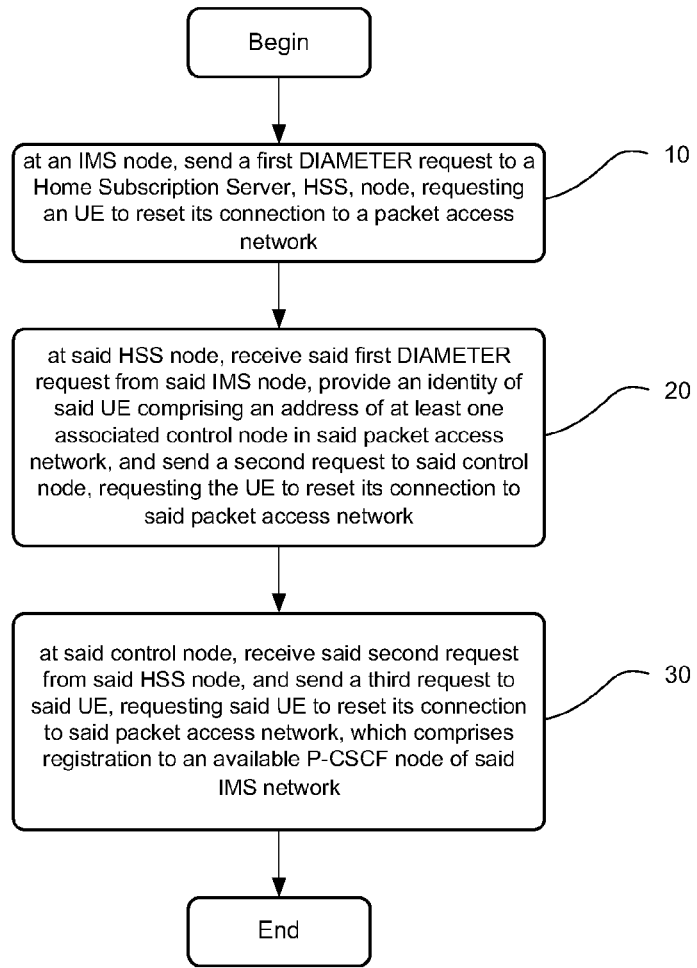
FIG. 2 is a flow diagram illustrating steps of a method according to an embodiment of the present invention.

FIG. 2 illustrates the main steps according to the method. Once the S-CSCF node or AS node that intended to reach the UE has detected the P-CSCF failure, it proceeds as follows. The S-CSCF node which handles the corresponding SIP signalling sends a DIAMETER message to the HSS node. This corresponds to step 10. The DIAMETER message is preferably a DIAMETER User Authorization Request (UAR), indicating through a new value in the User-Authorization-Type Attribute-Value Pair (AVP) that a new registration of the UE is required. The new value for the User-Authorization-Type AVP is preferably "NEW_REGISTRATION_NEEDED". The request preferably includes the UE's IMS identity (IMPU).

Alternatively, the DIAMETER message may be a DIAMETER Server-Assignment Request (SAR), indicating that a reset of the concerned cellular packet connection is requested. In that case, the SAR request comprises an Attribute-Value Pair (AVP) to carry the reset request.

Upon reception of the above specified DIAMETER message, the HSS node translates the received IMPU into the corresponding packet system identity (IMSI), and looks up which packet control node is responsible for the corresponding packet registration. When the UE is attached to an LTE RAN, the corresponding node is an MME node of the LTE architecture. The HSS node proceeds with sending a DIAMETER message to the identified MME node, in which it requests a reset of the UE's packet access. The DIAMETER message is preferably a DIAMETER Cancel-Location-Request (CLR) message, with the Cancellation-Type AVP having a new value, for example "RE_ATTACH_PROCEDURE". This corresponds to step 20.

Upon reception of the above specified DIAMETER CLR request, the MME node sends a detach request to the corresponding UE, including a further request to immediately re-attach to the RAN. A detach request with a request for an immediate attach is specified in the existing 3GPP TS 23.401 standard.

The UE accepts the detach requests, detaches from the packet access network and starts attach procedures according to 3GPP TS 23.4012. As part of the attach procedures, the UE receives an address of an available P-CSCF node of the IMS network. It uses this address to start a registration towards this new P-CSCF node, by means of a SIP REGISTER message. Standard IMS registration procedures complete this routine to re-establish the UE's IMS connectivity. This corresponds to step 30.

Once the registration has been completed, the S-CSCF recognizes that the UE has a new registration, which may be used for the SIP session that is to be setup. The S-CSCF sends the corresponding SIP INVITE to the UE.

Figure 3:
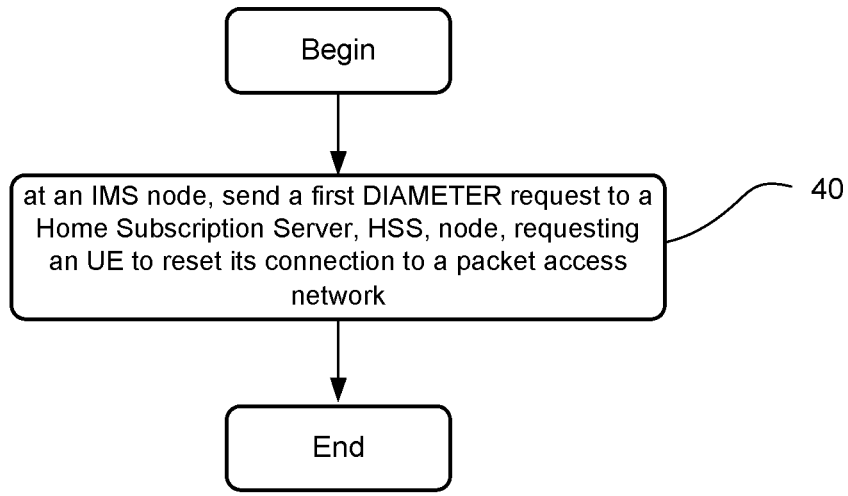
FIG. 3 is a flow diagram illustrating steps of a method according to an embodiment of the present invention.
Figure 4:
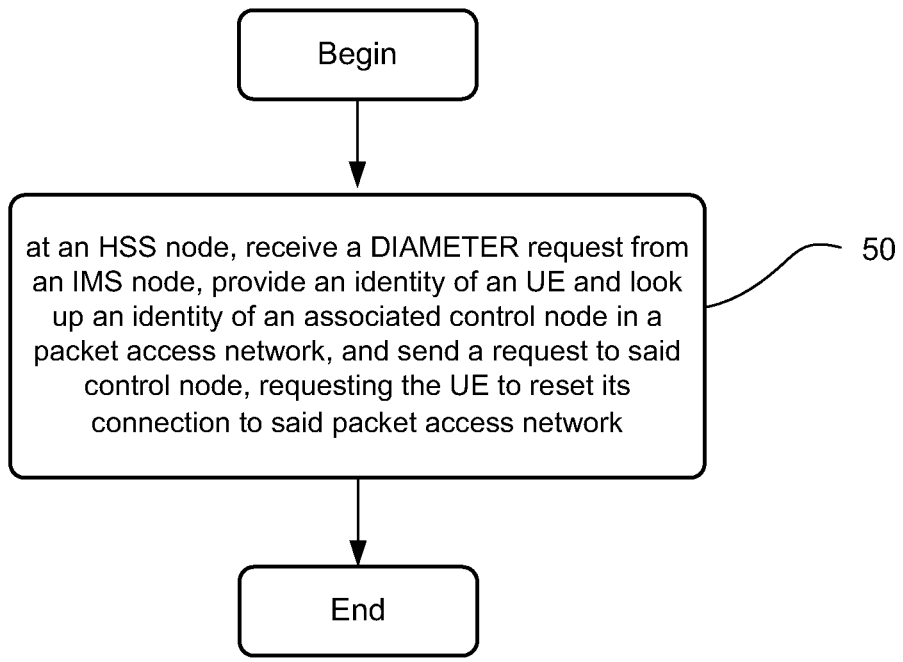
FIG. 4 is a flow diagram illustrating steps of a method according to an embodiment of the present invention.
Figure 5:
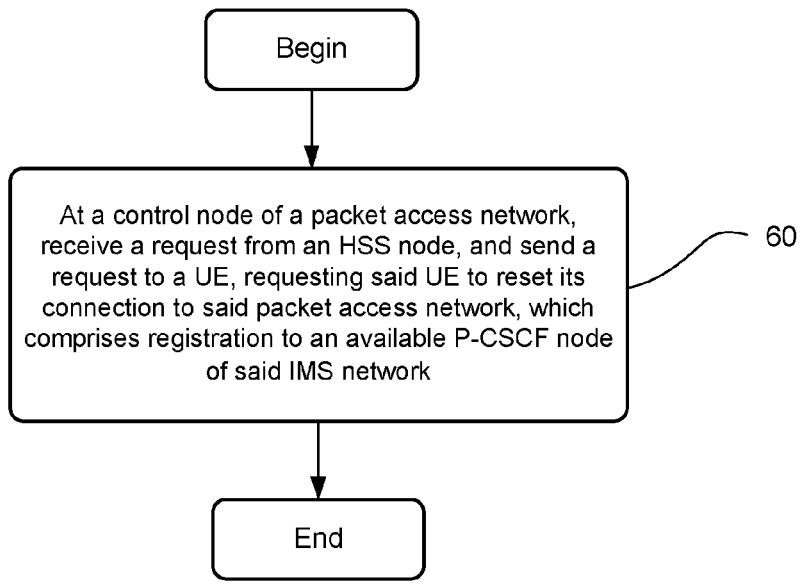
FIG. 5 is a flow diagram illustrating steps of a method according to an embodiment of the present invention.

FIG. 3 illustrates the main steps of the described method which are carried out by the calling IMS node, such as the S-CSCF node. FIG. 4 illustrates the main steps of the described method which are carried out by the HSS node. Similarly, FIG. 5 illustrates the main steps of the described method which are carried out by the control node, such as the MME node of the LTE architecture.

This outlines the underlying principles of the method according to the present invention. Embodiments thereof are described without loss of generality.

Figure 6:
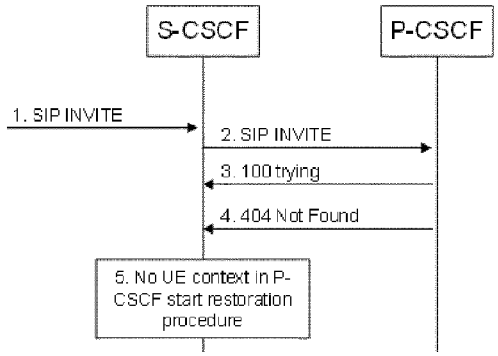
FIG. 6 shows signalling associated with a method for detecting a P-CSCF failure.
Figure 7:
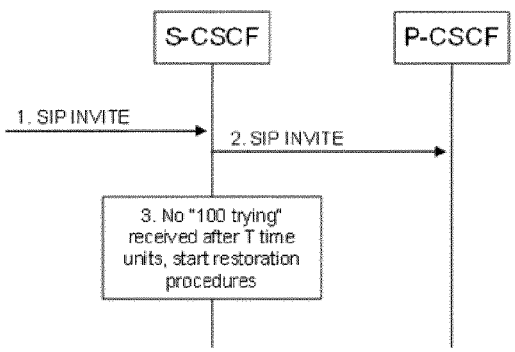
FIG. 7 shows signalling associated with a method for detecting a P-CSCF failure.

FIG. 6 and FIG. 7 illustrate describe two possible scenarios which lead to the detection of a P-CSCF node failure. A SIP INVITE message is received by an S-CSCF node. This message may, for example, originate from a MMTel AS in the IMS network, which intends to contact a specific UE. The S-CSCF sends a corresponding SIP INVITE message to the P-CSCF with which the UE had registered. In the example shown in FIG. 6, the corresponding P-CSCF is available, but due to a failure or malfunction it is unable to find the data related to the called UE. The P-CSCF node typically indicates by a "100 trying" SIP message that it is currently trying to locate the data. Upon eventually failing to do so, it sends a corresponding message to the S-CSCF node, indicating that the called user is unknown. This message corresponding message may be a "404 Not Found" message, or any relevant 4xx or 5xx message of the SIP protocol.

In the example shown in FIG. 7, the P-CSCF node is not available, so that the S-CSCF detects the failure after a fixed timeout, when no response from the P-CSCF has been received.

After detecting the P-CSCF failure, the S-CSCF initiates the restoration procedure according to the present invention, which aims at restoring the called UE's connectivity to the IMS network. The procedure may be asynchronous, so that the calling S-CSCF does not wait until the called UE's connectivity has been restored before continuing to handle session signalling. The procedure may as well be synchronous, so that the calling S-CSCF does wait until the called UE's connectivity has been restored before continuing to handle session signalling.

Figure 8:
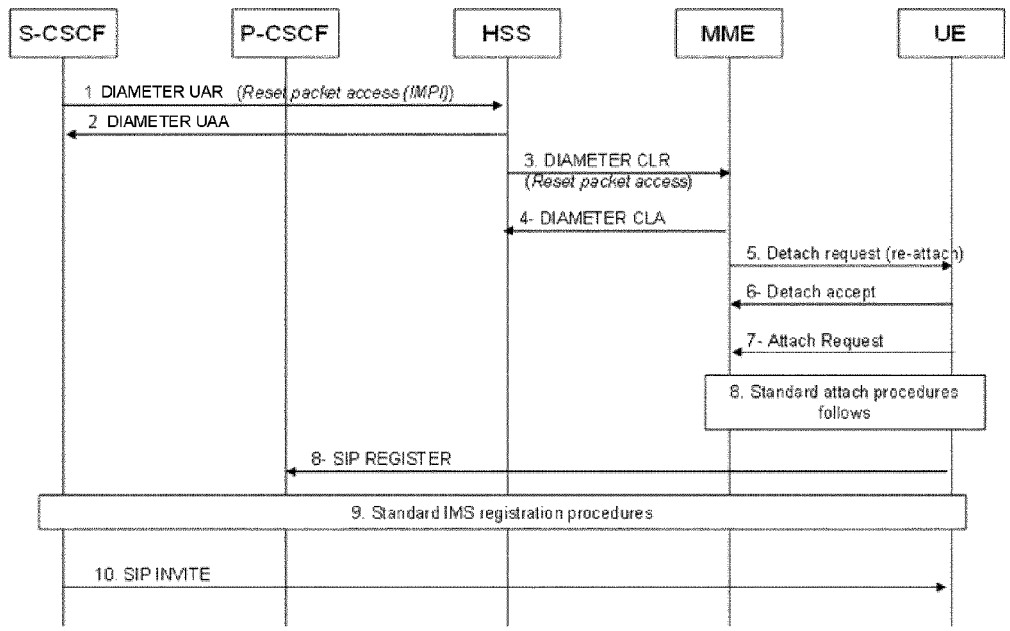
FIG. 8 shows signalling associated with a method according to an embodiment of the present invention.

FIG. 8 shows the main steps involved in the asynchronous case. In the first step, the S-CSCF node sends a DIAMETER User Authorization Request (UAR) to the HSS node. The UAR message indicates that a new registration of the UE is required. The request is conveyed by a new value in the User-Authorization-Type Attribute-Value Pair (AVP) of the UAR, which is preferably "NEW_REGISTRATION_NEEDED".

Upon reception of the UAR request, which preferably includes the IMS identity (IMPU) of the UE, the HSS acknowledges receipt by returning a corresponding DIAMETER User-Authorization-Answer (UAA) message to the calling S-CSCF node. In step 3, the HSS maps the received IMPU to the corresponding packet system identity (IMSI) of the UE, and looks up which packet node is responsible for the UE's packet registration. The HSS stores identities of UEs in a memory, which is configured as a database for example. If the UE connects using an LTE RAN, the node that is looked up by the HSS is an MME node. The HSS sends a DIAMETER Cancel-Location-Request (CLR) to the identified MME node. The message preferably includes an AVP indicating that the packet access of the UE should be reset. The AVP is preferably the Cancellation-Type AVP, and the request is preferably conveyed by the value "RE_ATTACH_PROCEDURE". As an alternative, other DIAMETER messages may be used to convey this information.

The MME node acknowledges receipt of the DIAMETER CLR message using a DIAMETER CLA (Cancel-Location Answer) message. It proceeds with sending a detach request, including a request for an immediate attach, to the UE. This may for example be implemented by a known request according to the 3GPP TS 23.401 standard, which provides a detach request with a request for an immediate re-attach. Upon reception of the corresponding request, the UE acknowledge receipt to the MME node in step 6. The UE starts the requested attach procedure in step 7, by sending an attach request to the MME node. Standard known packet service attach procedures according to the 3GPP TS 23.401 standard follow. As part of these procedures, the UE obtains the address of an available P-CSCF node of the IMS network. The UE uses this address to start a registration towards the available P-CSCF by means of an SIP REGISTER message, step 8. Standard known IMS registration procedures follow. Once the registration has been completed, the calling S-CSCF will be able to set up a connection to the UE, as initially intended.

Figure 9:
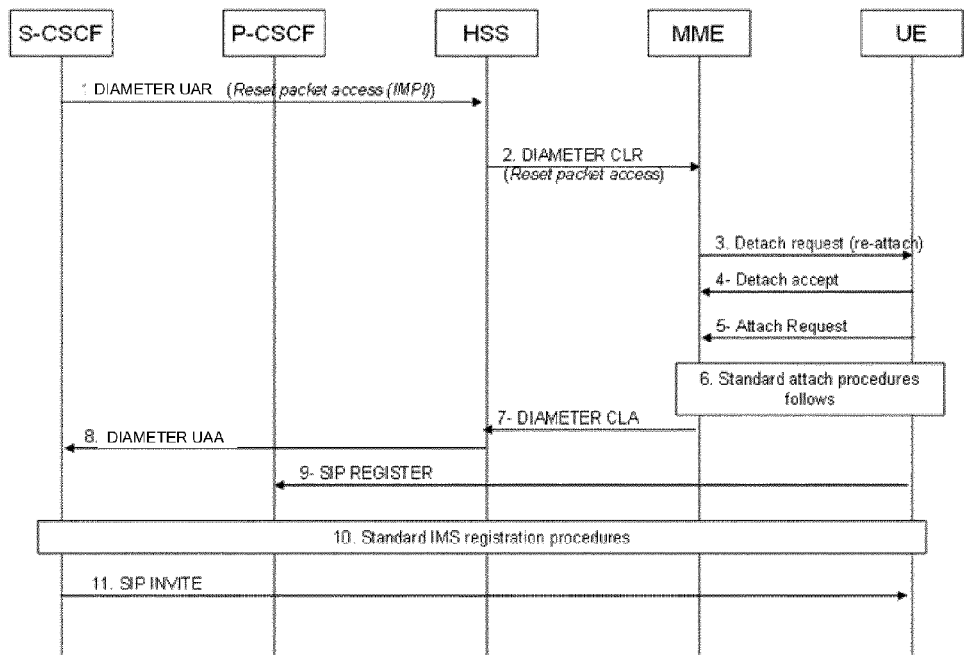
FIG. 9 shows signalling associated with a method according to an embodiment of the present invention.

FIG. 9 illustrates a corresponding asynchronous implementation of the same restoration procedure. The difference to the scenario of FIG. 8 lies in the fact that the initial DIAMETER UAR request is only acknowledged once the UE's connectivity to the IMS network has been successfully restored. This enables the S-CSCF to keep the call on hold while waiting for the UE to become available. To a calling user, the procedure will therefore be almost completely transparent, except for a slightly increased delay during call setup, which is due to the re-registration process. In all cases, the quality of service is increased, as without the outlined method, the call to the UE would have failed.

In all the described embodiments of the method according to the present invention, the S-CSCF node may be replaced by an AS node of the IMS network, which may directly initiate the corresponding procedure, without contacting the S-CSCF node first. The AS could be any AS that needs to establish a connection with a UE, as for example a Multimedia Telephony AS, an SMS IP Gateway AS, a Session Continuity and Centralization Application Server, SCC AS, or any other known Application Server.

In all the described embodiments, the UE has been supposed to connect to the IMS through an LTE RAN. Alternatively, the UE may connect to the IMS using a second or third generation (2G, 3G) RAN, for example a GPRS network or an HSPA network. In such a case, the MME nodes in FIG. 8 and FIG. 9 may be replaced by a corresponding Serving GPRS Support Node (SGSN), for example. Communication between the HSS node and the corresponding SGSN node may be implemented using the DIAMETER protocol, as described, or alternatively using the Mobile Application Part (MAP) protocol, in which case the CLR request will be replaced by a MAP_CANCEL_LOCATION message indicating a "reset packet access" cancellation type.

In an alternative embodiment, the UE may be associated to both an SGSN node and an MME node at the same time, potentially providing access to two packet services. In that case, the described Cancel Location request is sent from the HSS to both the MME and the SGSN node. The UE starts the described packet access procedure on the packet service that is active.

Figure 10:
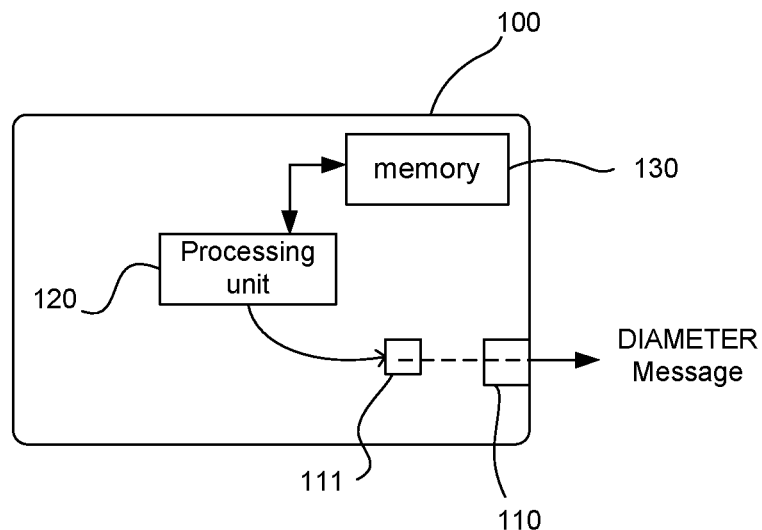
FIG. 10 illustrates schematically an embodiment of an apparatus implementing an IMS node according to the present invention.

FIG. 10 schematically illustrates an embodiment of an IMS node 100 according to the present invention. The node is configured to operate as an S-CSCF node or, alternatively, an Application Server (AS) node. This may provide the functionality of the S-CSCF node in FIGS. 8 and 9. The node 100 comprises at least one sending unit 110 for sending DIAMETER messages. The node 100 further comprises a processor 120 and a memory 130, wherein the processor 120 is configured to generate a DIAMETER request 111, requesting a User Equipment (UE) to reset the connection to its packet access network. The processor is further configured to transmit said DIAMETER request to a Home Subscription Server (HSS) node.

Figure 11:
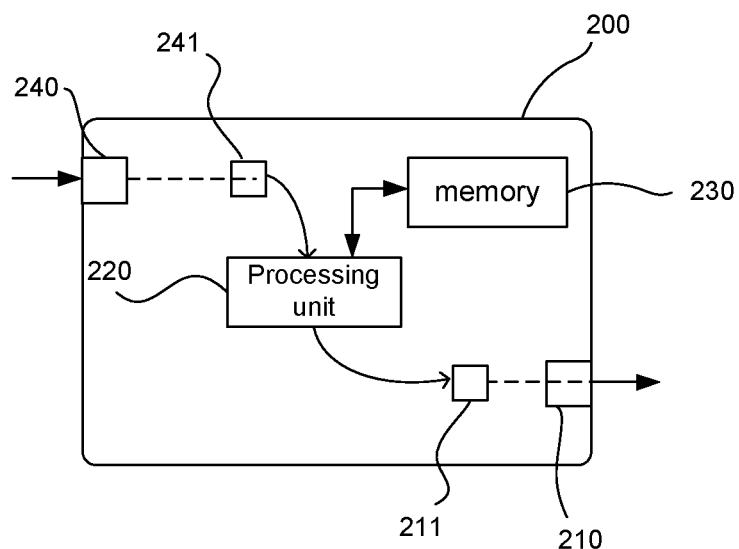
FIG. 11 illustrates schematically an embodiment of an apparatus implementing an HSS node according to the present invention.

FIG. 11 schematically illustrates an embodiment of an HSS node 200 according to the present invention. The node may provide the functionality of the HSS node in FIGS. 8 and 9. The node 200 comprises at least one receiving unit 240 for receiving DIAMETER messages from an IMS node. The node 200 further comprises at last one sending unit 210 for sending DIAMETER or MAP messages, for example. The node 200 further comprises a processor 220 and a memory 230, wherein the processor 120 is configured to receive a DIAMETER request 241, requesting a User Equipment (UE) to reset the connection to its packet access network. The processor is further configured to generate a request 211, requesting the UE to reset its connection to said packet access network, and to transmit said request 211 to said control node.

Figure 12:
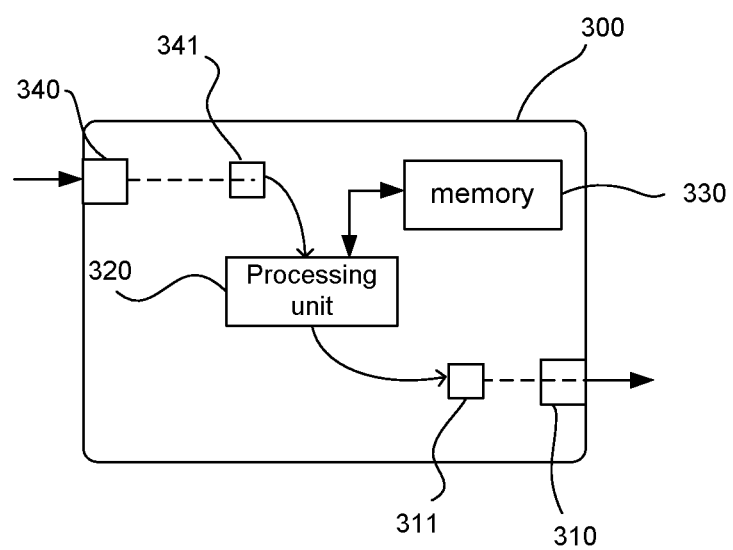
FIG. 12 illustrates schematically an embodiment of an apparatus implementing a control node according to the present invention.

FIG. 12 schematically illustrates an embodiment of a control node 300 of a packet access network, according to the present invention. The node may provide the functionality of the MME node in FIGS. 8 and 9, or, alternatively, of an SGSN node. The node 300 comprises at least one receiving unit 340 for receiving requests from a HSS node. The node 300 further comprises at last one sending unit 310 for sending messages. The node 300 further comprises a processor 320 and a memory 330, wherein the processor 320 is configured to receive a request 341, requesting a User Equipment (UE) to reset the connection to its packet access network. The processor is further configured to generate a request 311, requesting the UE to reset its connection to said packet access network, and to transmit said request to said UE.

Memories 130, 230, 330 store instructions for processing by the respective processing units 120, 220, 330. Each node 100, 200, 300 may be considered as a computer configured to act as described by processing the corresponding stored instructions.

It will be appreciated by the person skilled in the art that various modifications may be made to the above described embodiments without departing from the scope of the present invention.

The invention claimed is:

1. A method for restoring connectivity between an IMS node in an IP Multimedia Subsystem, IMS, network, and a User Equipment, UE, the UE being associated with a Proxy Call Session Control Function node, P-CSCF, of said IMS network, the UE further being associated with at least one control node of a packet access network that is used by the UE to connect to said IMS network, wherein said IMS node has failed to establish a communication to said UE via said P-CSCF node, said method comprising:
   at said IMS node, sending a first DIAMETER request to a Home Subscription Server, HSS, node, requesting the UE to reset a connection to said packet access network associated with the UE, wherein the first request indicates a new registration of the UE is required;
   at said HSS node, receiving said first DIAMETER request from said IMS node, providing an identity of said UE, looking up an address of the at least one control node to which said UE is associated in said packet access network, and sending a second request to said at least one control node, requesting the UE to reset the connection to said packet access network, wherein the second request indicates that re-attachment of the UE is required; and
   at said at least one control node, receiving said second request from said HSS node, and sending a third request to said UE, requesting said UE to reset the connection to said packet access network, said reset comprising registration to an available P-CSCF node of said IMS network.

2. The method according to claim 1, wherein said first DIAMETER request is a DIAMETER User-Authorization-Request, UAR, having a User-Authorization-Type Attribute-Value-Pair, AVP, value indicating "NEW_REGISTRATION NEEDED".

3. The method according to claim 1, wherein said second request is a DIAMETER Cancel-Location-Request, CLR, having a Cancellation-Type Attribute-Value-Pair, AVP, value indicating "RE_ATTACH_PROCEDURE".

4. The method according to claim 1, wherein said IMS node is a Serving Call Session Control Function, S-CSCF.

5. The method according to claim 1, wherein said IMS node is an IMS Application Server, IMS AS, node, the IMS AS being a Multimedia Telephony Application Server, MMTel AS, providing Voice and multimedia communication services over a mobile packet service, or a Telephony Application Server, TAS, providing Voice over Long Time Evolution, LTE, networks, or a Session Continuity and Centralization Application Server, SCC AS.

6. The method according to claim 1, wherein said packet access network is a Long Time Evolution, LTE, network and wherein said control node is a Mobile Management Entity, MME, node.

7. The method according to claim 1, wherein said packet access network is a General Packet Radio Service, GPRS, network and wherein said control node is a Serving GPRS Support Node, SGSN.

8. A method for requesting by an Internet Multimedia Subsystem, IMS, network node, a User Equipment, UE, to reset a connection to a packet access network associated with the UE, the method comprising:
sending, from the IMS network node, a DIAMETER request to a Home Subscription Server, HSS, node, requesting the UE to reset the connection to said packet access network associated with the UE,
wherein the DIAMETER request indicates that a new registration of the UE to an available P-CSCF node is required.

9. The method according to claim 8, wherein said DIAMETER request is a DIAMETER User-Authorization-Request, UAR, having a User-Authorization-Type Attribute-Value-Pair, AVP, value indicating "NEW_REGISTRATION NEEDED".

10. The method according to claim 8, wherein said IMS network node is an IMS Application Server, IMS AS, node, the IMS AS being a Multimedia Telephony Application Server, MMTel AS, providing Voice and multimedia communication services over a mobile packet service, or a Telephony Application Server, TAS, providing Voice over Long Time Evolution, LTE, networks, or a Session Continuity and Centralization Application Server, SCC AS.

11. A method for handling a first DIAMETER request by a Home Subscription Server, HSS, node, said first DIAMETER request being received from an Internet Multimedia Subsystem, IMS node and said first DIAMETER request requesting an UE to reset a connection to a packet access network associated with the UE, the method comprising:
receiving, from the IMS node, the first DIAMETER request requesting the UE to reset the connection to the packet access network associated with the UE;
providing an identity of a control node of said packet access network to which said UE is associated; and
sending a request to said control node, requesting the UE to reset the connection to said packet access network, wherein the request indicates that re-attachment of the UE is required.

12. The method according to claim 11, wherein said first DIAMETER request is a DIAMETER User-Authorization-Request, UAR, having a User-Authorization-Type Attribute-Value-Pair, AVP, value indicating "NEW_REGISTRATION NEEDED".

13. The method according to claim 11, wherein said IMS node is an IMS Application Server, IMS AS, node, the IMS AS being a Multimedia Telephony Application Server, MMTel AS, providing Voice and multimedia communication services over a mobile packet service, or a Telephony Application Server, TAS, providing Voice over Long Time Evolution, LTE, networks, or a Session Continuity and Centralization Application Server, SCC AS.

14. Apparatus configured to operate as an IP Multimedia Subsystem, IMS, network node, the apparatus comprising:
a processor; and
a memory coupled to the processor and comprising computer readable program code that when executed by the processor causes the processor to perform operations comprising:
generating, by the IMS network node, a DIAMETER request, requesting a User Equipment, UE to reset a connection to a packet access network associated with the UE, wherein the DIAMETER request indicates that a new registration of the UE to an available P-CSCF node is required; and
transmitting, from the IMS network node, said DIAMETER request to a Home Subscription Server, HSS, node.

15. The apparatus according to claim 14, wherein said apparatus is configured to operate as a Serving Call Session Control Function, S-CSCF, IMS node.

16. The apparatus according to claim 14, wherein said apparatus is configured to operate as an IMS Application Server, AS, node, the IMS AS being a Multimedia Telephony Application Server, MMTel AS, providing Voice and multimedia communication services over a mobile packet service, or an IMS Telephony Application Server, TAS, providing Voice over Long Time Evolution, LTE, networks, or an IMS Session Continuity and Centralization Application Server, SCC AS.

17. The apparatus according to claim 14, wherein said first DIAMETER request is a DIAMETER User-Authorization-Request, UAR, having a User-Authorization-Type Attribute-Value-Pair (AVP) value indicating "NEW_REGISTRATION NEEDED".

18. An apparatus configured to operate as a Home Subscription Service, HSS, node the apparatus comprising:
a processor; and
a memory configured for storing identities relating to User Equipments, UEs, the memory coupled to the processor and comprising computer readable program code that when executed by the processor causes the processor to perform operations comprising:
receiving, from an Internet Multimedia Subsystem, IMS node, a first DIAMETER request, requesting a User Equipment, UE to reset a connection to a packet access network associated with the UE, wherein the first DIAMETER request indicates a new registration of the UE is required;
generating a second request, requesting the UE to reset the connection to said packet access network associated with the UE, wherein the second request indicates that re-attachment of the UE is required; and
transmitting said second request to a control node of said packet access network, the UE being associated to said control node.

19. The apparatus according to claim 18, wherein said first DIAMETER request is a DIAMETER User-Authorization-Request, UAR, having a User-Authorization-Type Attribute-Value-Pair (AVP) value indicating "NEW_REGISTRATION NEEDED".

* * * * *

UNITED STATES PATENT AND TRADEMARK OFFICE
CERTIFICATE OF CORRECTION

PATENT NO.       : 9,596,712 B2
APPLICATION NO.  : 14/402471
DATED            : March 14, 2017
INVENTOR(S)      : Hallenstål et al.

It is certified that error appears in the above-identified patent and that said Letters Patent is hereby corrected as shown below:

In the Specification

In Column 4, Line 30, delete "Internet" and insert -- Internet Protocol --, therefor.

In Column 4, Line 47, delete "Cancel-Location-Request, (CLR)" and insert
-- Cancel-Location-Request (CLR) --, therefor.

In Column 5, Line 33, delete "Service" and insert -- Server --, therefor.

In Column 6, Line 64, delete "identity" and insert -- public user identity --, therefor.

In Column 8, Line 17, delete "identity" and insert -- public user identity --, therefor.

In the Claims

In Column 11, Line 57, in Claim 14, delete "Apparatus" and insert -- An apparatus --, therefor.

In Column 12, Line 33, in Claim 18, delete "Service," and insert -- Server, --, therefor.

Signed and Sealed this
Sixteenth Day of May, 2017

Michelle K. Lee
*Director of the United States Patent and Trademark Office*